March 28, 1961 D. N. JUDELSON 2,977,128
CHUCK FOR ROTARY KNIFE CUTTING MACHINE
Filed March 19, 1959 2 Sheets-Sheet 1

INVENTOR.
DAVID N. JUDELSON
BY
Amster + Levy
ATTORNEYS

March 28, 1961 D. N. JUDELSON 2,977,128
CHUCK FOR ROTARY KNIFE CUTTING MACHINE
Filed March 19, 1959 2 Sheets-Sheet 2

INVENTOR.
DAVID N. JUDELSON
BY
Amster & Levy
ATTORNEYS

United States Patent Office 2,977,128
Patented Mar. 28, 1961

2,977,128

CHUCK FOR ROTARY KNIFE CUTTING MACHINE

David N. Judelson, New York, N.Y., assignor to Oscar I. Judelshon, Inc., New York, N.Y., a corporation of New York Filed Mar. 19, 1959, Ser. No. 800,413

12 Claims. (Cl. 279—110)

The present invention relates generally to chucks useful in rotary knife cutting machines, and in particular to an improved chuck having provision for the simultaneous actuation of the several gripping jaws thereof.

A typical rotary knife cutting machine comprises a longitudinal supporting shaft or spindle on the machine frame which receives a roll of material wound on a core which roll is adapted to be parted or cut into strips of a prescribed width by the action of a high speed rotary knife. Such machine incorporates a chuck which is rotatably mounted on the supporting shaft and driven from an appropriate variable speed drive. The chuck includes one or more gripping jaws which are individually brought into engagement with the outer periphery of the roll of material to clamp the roll to the chuck such that the roll is turned about the supporting shaft of the cutting machine during the cutting operation. The roll of material is parted or cut into successive strips by bringing the high speed rotary knife of the machine into cutting relation with the turning roll and indexing the rotary cutting knife stepwise down the length of the rotating roll of material to make the successive cuts of the prescribed width. A typical machine of this type is shown in my U.S. Pat. No. 2,457,310 of December 28, 1948.

Conventional chucks for such rotary knife cutting machines usually include a series of gripping or clamping jaws which are mounted on the chuck body for radial movement inwardly and outwardly into and out of gripping engagement with the outer periphery of the roll of material. The gripping or clamping jaws include pointed roll-penetrating elements or pins which are adapted to penetrate the outer periphery of the roll and extend radially thereof such that the roll of material and its core are rotated on the supporting shaft or spindle in response to drive of the chuck. With such conventional chucks, the operator individually urges each gripping or clamping jaw into the roll-engaging position and thereafter locks such gripping jaw in the roll-engaging position with the roll-penetrating pin engaged into the body of the roll. It has been found advantageous to make provision for the actuation of the gripping or clamping jaws such that the jaws may be moved simultaneously into and out of engagement with the roll of material. Preferably, the ability to simultaneously actuate the several gripping jaws should be realized in an environment enabling the movement of such gripping jaws from an outer limit position contiguous to the outer periphery of the chuck to an inner limit position contiguous to the supporting shaft on which the chuck is rotatably mounted. Such range of movement for the gripping jaws makes it possible for the machine operator to clamp rolls of material which have an outer diameter corresponding to the maximum diameter which may be accommodated on the chuck with the gripping jaws at the outer limit position, to rolls of a rather small diameter which can only be chucked if the gripping jaws can be brought to an inner limit position closely adjacent to the supporting shaft. With a somewhat conventional system for mounting the gripping jaws, it has not been found feasible to bring such gripping jaws to an inner limit position closely adjacent to the supporting shaft. Accordingly, rather small diameter rolls cannot be properly engaged by the gripping jaws for attachment to the chuck and a limitation is imposed on the minimum diameter of the roll which may be handled in the rotary knife cutting machine.

Broadly, it is an object of the present invention to provide an improved means for rotating a roll of material useful in a rotary knife cutting machine. Specifically, it is within the contemplation of the present invention to provide an improved chuck for use with a roll of material wound on a core which has the facility for the simultaneous actuation of the gripping jaws thereof over a wide range of adjustment radially of the chuck.

It is a further object of the present invention to provide an improved chuck having provision for the engagement of a roll of material radially at the outer periphery thereof and axially contiguous to the core thereof to assure a more reliable releasable attachment of the roll to the chuck.

In accordance with an illustrative embodiment demonstrating features and advantages of the present invention there is provided a chuck for use on the shaft of a rotary knife cutting machine which is adapted to receive a roll of material which comprises a chuck body, bearing means operatively connected to the chuck body for journaling the chuck body on the shaft for rotation relative thereto, and a drive operatively connected to the chuck body for rotating the chuck body about the shaft. An actuating member is turnable relative to the shaft and is operatively connected to the chuck body. A housing including an annular face plate confronting the actuating member is adapted to contact an end face of the roll. Means are provided on the face plate which engage the outer periphery of the actuating member for mounting the face plate on the actuating member for turning movement relative to the actuating member. A group of gripping jaws are provided which project from the face plate, with appropriate means mounting each of the gripping jaws on the face plate for movement radially inwardly and outwardly thereof into and out of gripping engagement with the roll of material. Means couple each of the gripping jaws to the actuating member for radial movement in response to relative turning movement between the actuating member and the face plate. Accordingly, upon such relative turning movement, the gripping jaws may be brought into and out of engagement with the outer periphery of the roll of material for selectively coupling and decoupling the roll of material to the chuck.

In accordance with further aspects of the invention, provision is made for engaging the roll of material contiguous to the core thereof for connecting the inner portion of the roll of material to the chuck body. To this end the chuck body is formed with a further group of radially extending slots behind the actuating member, which slots receive and slidably mount a further group of gripping jaws which are movable radially inwardly and outwardly of the face plate. The further gripping jaws each include a roll-penetrating element extending axially through the actuating member and the face plate and adapted to axially penetrate the adjacent end face of the roll of material adjacent to the core. A further actuating member is journaled on the chuck body for turning movement relative thereto and is coupled to the further gripping jaws such that in response to relative turning movement between the further actuating member and the chuck body the further actuating jaws may be moved toward each other after the roll-penetrating elements axially penetrate the end face of the roll. Accordingly, upon operating the respective actuating members in sequence, the roll of material may be clamped to the chuck contiguous to its outer periphery and its supporting core for rotation by the chuck during operation of the rotary knife cutting machine.

The above brief description, as well as further objects, features and advantages of the present invention will be more fully understood by reference to the following detailed description of a presently preferred, but illustrative embodiment according to the invention when taken in conjunction with the accompanying drawings, wherein.

Figure 1:
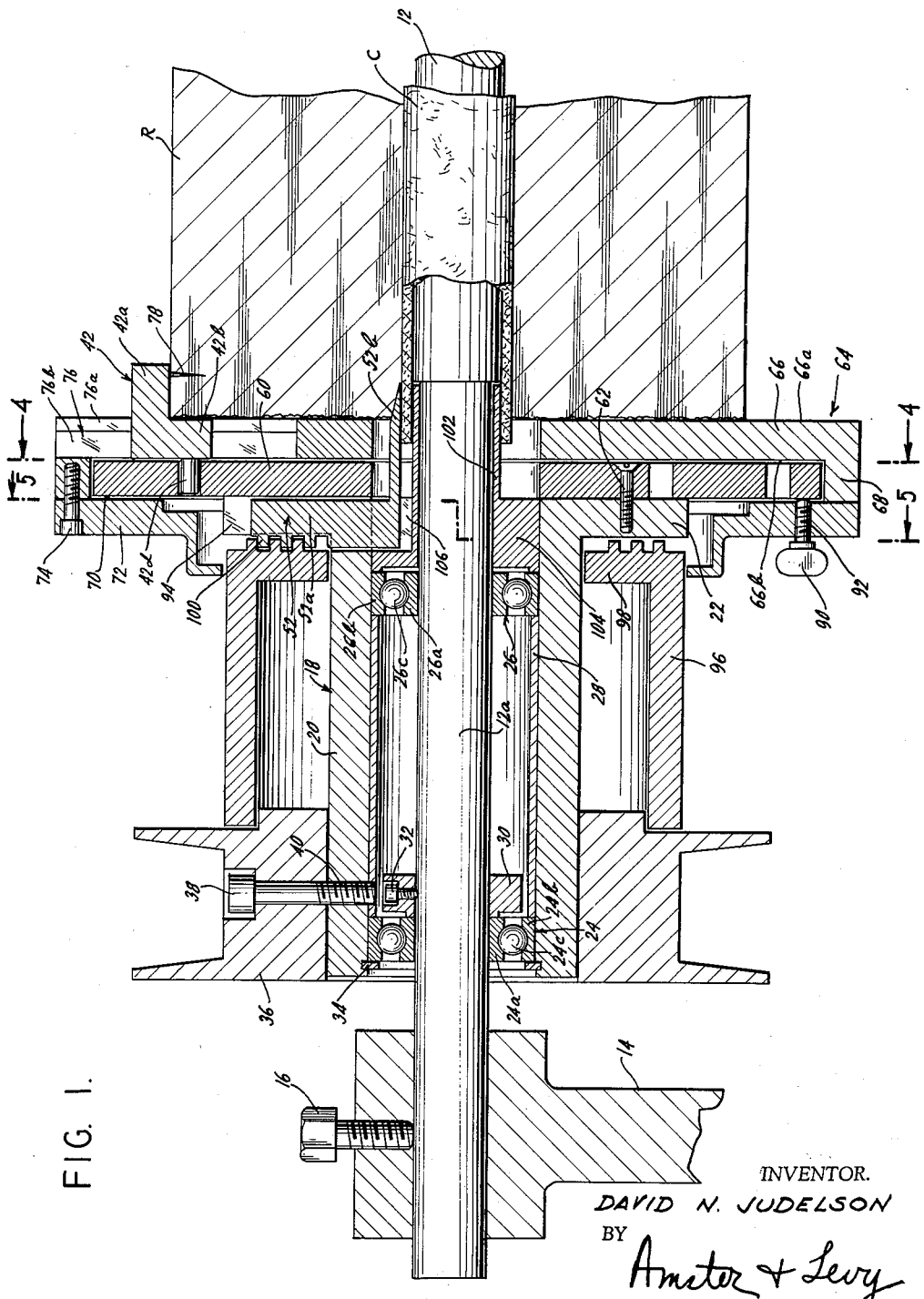
Figure 1 is an elevational view, with parts broken away and sectioned, showing my improved chuck on the roll-supporting shaft of a typical rotary knife cutting machine, the chuck being shown connected to the adjacent end of a roll of material carried on a core and mounted on the shaft of such machine.

Referring now specifically to the drawings, there is shown in Figure 1 my improved chuck, generally designated by the reference numeral 10, which is to be employed in conjunction with a roll of material R wound on a core C which is received on the supporting shaft or spindle 12 of a rotary knife cutting machine. In the interests of simplicity and clarity the details of the rotary knife cutting machine, except for the supporting shaft or spindle 12 and the adjacent supporting stanchion 14, have been eliminated. For a detailed showing of the typical environment in which the improved chuck may be employed, reference may be made to U.S. Patent No. 2,457,310 or to copending application Serial No. 722,301 filed March 18, 1958, and entitled Improved Chuck for Rotary Knife Cutting Machine. However, it is to be expressly understood that the machines of my issued patent and of my copending application are intended to merely illustrate typical applications for the chuck, and the chuck 10 will have further application in different types of rotary knife cutting machines as will be apparent to those skilled in this art.

The chuck 10 is rotatably journaled on the turned-down end section 12a of the supporting shaft or spindle 12 which supporting shaft is secured to the stanchion 14 by means of the set screw or bolt 16. The chuck 10 incorporates a chuck body 18 which includes a cylindrical sleeve section 20 terminating at one end in an annular flange section 22 projecting radially and outwardly therefrom. The chuck body 18 is journaled on the turned down-end section 12a of the supporting shaft 12 for rotation by a pair of bearings 24, 26 separated by a spacer bearing sleeve 28. Each of the bearings 24, 26 includes an inner race 24a, 26a journaled on the turned-down end section 12a of the shaft, an outer race 24b, 26b secured to the sleeve section 20 and interposed ball bearings 24c, 26c. The bearing assembly 24, 26 is positioned with respect to the shaft 12 by a stop collar 30 which abuts the inner face of the bearing 24 and is fixed in place by appropriately threaded bolt 32 which engages the turned-down end section 12a of the shaft 12. The bearing 24 is engaged at its outer face by an appropriate C clamp or lock ring 34 which is engaged within a seat formed in the inner periphery of the sleeve section 20 of the chuck body 18.

Appropriate drive means are operatively connected to the chuck body 18 for rotating the chuck body on the turned-down end section 12a of the shaft 12 for the purpose of rotating the roll R about the supporting shaft 12. In this illustrative embodiment, a driving pulley 36 is mounted on the end of the sleeve section 20 remote from the annular flange section 22 and is secured thereto by one or more appropriate attachment bolts 38. As seen best in Figure 1, the attachment bolt 38 extends into an appropriate tap hole 40 extending radially of the sleeve section 20 in alignment with the bolt 32 of the stop collar 30. Accordingly, upon removal of the driving pulley 36 ready access can be had to the bolt 32 through the aligned opening in the sleeve section 20 and in the spacer sleeve 28 for dismantling the chuck.

The chuck 10 is provided with a series of outer gripping or clamping jaws, designated respectively by the reference numeral 42, 44, 46, 48, which are circumferentially spaced at 90 degree intervals about the chuck and are adapted to radially penetrate and grip the roll of material R at its outer periphery, as seen best in Figure 1. Further, the chuck is provided with a series of inner gripping or clamping jaws, designated respectively by the reference numerals 52, 54, 56, and 58, which are adapted to first axially penetrate the adjacent end face of the roll R and thereafter move into gripping engagement with the underlying plies of the roll of material R and the contiguous end of the core C. Since the construction of my improved chuck may find useful application without the provision of the series or group of inner gripping jaws, the description will now proceed as if the jaws 52, 54, 56, and 58 and their associated structure were not present. Specifically, an annular actuating member 60 is arranged in substantial parallelism to the annular flange section 22 of the chuck body 18 and is secured to the outer face thereof by appropriate threaded screws or bolts 62 arranged at appropriate intervals about the annular extent of the actuating member 60. It will thus be appreciated that the chuck body 20, the driving pulley 36, and the actuating member 60 together constitute a unitary assembly which is turnable on the turned-down end section 12a of the shaft 12.

Encircling the actuating member 60 is a turnable housing 64 which includes an annular face plate 66 confronting the outer face of the actuating member 60. The outer face 66a of the annular face plate 66 is adapted to be contacted by the adjacent end face of the roll R of material, as seen best in Figure 1. Projecting inwardly from the inner face 66b of the face plate 66 is a marginal seating flange 68 which in this illustrative embodiment is integral with the face plate 66. The flange 68 cooperates with the face plate 66 to form an annular seat 70 for the actuating member 60 such that the face plate 66 is turnable relative to the actuating member 60 or vice versa. The turnable housing 64 is completed by an annular back plate 72 which is secured to the marginal flange 68 by a number of machine screws or bolts 74. It will thus be appreciated that the housing 64 is hung onto and supported by the actuating member 60, with the latter being secured to and driven by the chuck body 20.

Figure 2:
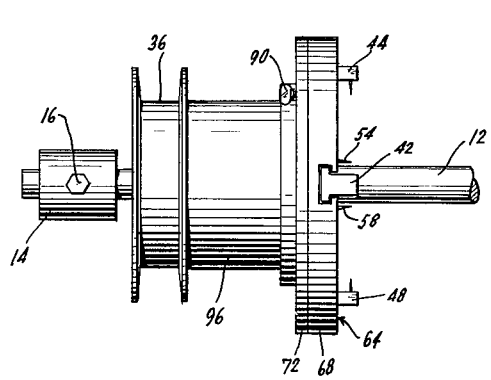
Figure 2 is a plan view, on a reduced scale, of the chuck.
Figure 3:
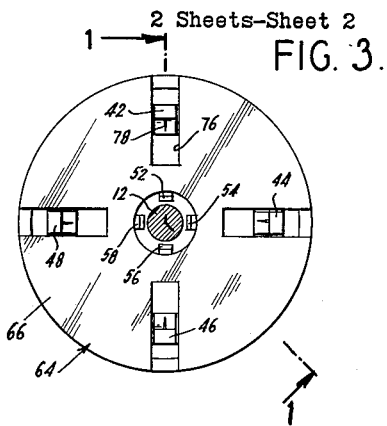
Figure 3 is an end elevational view of the chuck, taken from the right of Figures 1 and 2.

The chuck plate 66 carries the circumferentially spaced gripping jaws 42, 44, 46, 48 which penetrate the roll R at its outer periphery. The gripping or chucking jaws are of identical structure and are mounted at 90 degree intervals in appropriate slots or guideways for movement radially inwardly and outwardly of the chuck plate 66. For example the chuck or gripping jaw 42 is of substantially T-shaped configuration (see Figure 2) and is mounted for radial sliding movement in the radially-extending T-shaped guideway 76 formed in the face plate 66, with the leg section 42a thereof projecting outwardly from the outer face 66a of the face plate 66 and carrying a radially and inwardly extending roll-penetrating element or pin 78. The guideway 76 includes a narrow throat section 76a of a width comparable to the leg section 42a of the gripping or clamping jaw and a somewhat wider rear or base section 76b dimensioned to receive the cross head 42b of the gripping or chuck jaw 42. Although not described in detail, the remaining chuck jaws 44, 46, 48 and their complementary guideways or slots are of similar construction.

Figure 4:
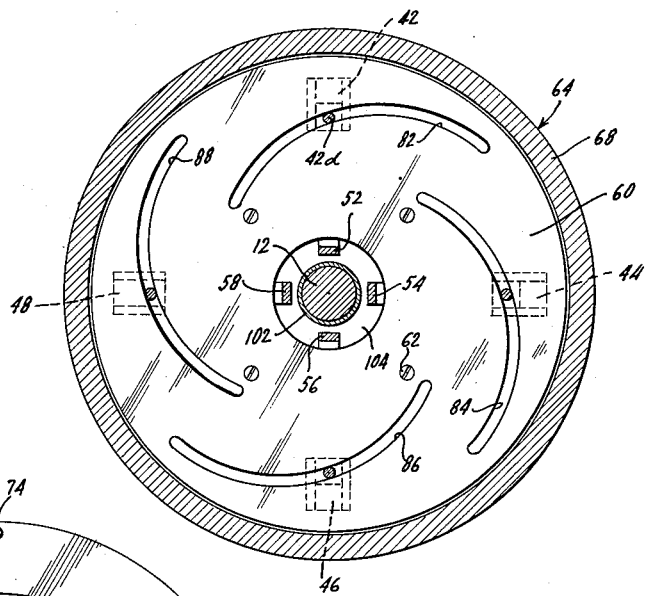
Figure 4 is a sectional view taken substantially along the line 4—4 of Figure 1, looking in the direction of the arrows.
Figure 5:
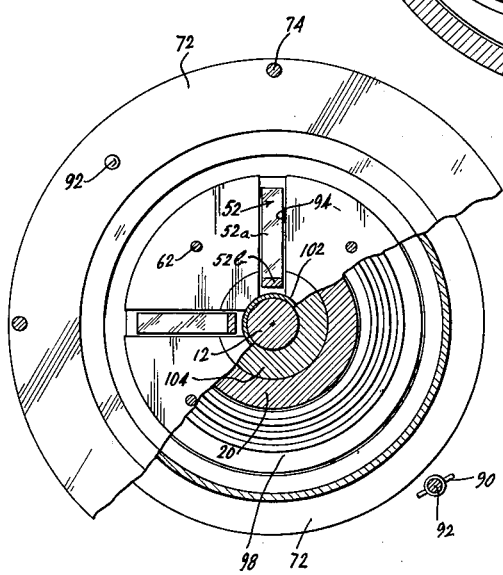
Figure 5 is a sectional view taken substantially along the line 5—5 of Figure 1, with parts broken away, looking in the direction of the arrows.

Means couple each of the gripping or clamping jaws 42, 46 and 48 to the actuating member 60 for radial movement into and out of gripping engagement with the roll of material R in response to relative turning movement between the actuating member 60 and the housing 64. As best seen in Figure 4 the actuating member or plate 60 is provided with four arcuate camming slots 82, 84, 86, 88. Each of the slots is positioned in relation to the center of the actuating member or plate 60 and the axis of rotation of the chuck 10 such as to lie along a progressively increasing spiral, with one end of each of the slots terminating contiguous to the inner periphery of the annular member or plate 60 and the other end of each slot terminating contiguous to the outer periphery thereof. The slots 82, 84, 86 and 88 receive rearwardly directed follower pins (such as the pin 42d of the gripping or clamping jaw 42) for coupling the individual outer gripping or clamping jaws 42, 44, 46, 48 to the actuating member or plate 60. Accordingly, in response to clockwise rotation of the actuating member or plate (as viewed in Figure 4), the gripping or clamping jaws, 42, 44, 46 and 48 move radially inwardly along the path determined by their respective guideways (i.e. guideway 76 for jaw 42); and in response to counterclockwise movement of the actuating member or plate 60, the respective clamping jaws will move outwardly and out of clamping relation with the roll R of material.

In order to releasably secure the common actuating member or plate 60 in any position of its rotation relative to the housing 64, a set screw 90 is mounted in an appropriate tapped hole 92 in the back plate 72, with its leading end in position to bear against the adjacent face of the actuating member 60. With the set screw 90 loosened and with the chuck body 20 and actuating member 60 held against rotation, the housing 64 may be spun in the appropriate direction to selectively engage or release the clamping jaw; and thereafter the relative turning movement between the housing and the actuating member may be precluded by tightening down of the set screw 90.

In order to more fully appreciate the function of the structure thus far described, a typical sequence of operations will be described:

The worker takes the roll R of material and places the same on the supporting shaft 12 and advances the roll toward the chuck plate 66. The end face of the roll is brought against the outer face 66a of the chuck plate with the respective outer gripping or clamping jaws 42, 44, 46 and 48 spaced radially and outwardly of the outer periphery of the roll to enable the roll R to be brought against the face plate of the chuck. Thereupon with the set screw 90 loosened and with the chuck body 20 being held, the worker spins the housing 64 relative to the actuating member 60 to bring the outer gripping or clamping jaws radially inwardly such that the respective roll-penetrating elements or pins 78 radially penetrate the outer periphery of the roll R, as seen best in Figure 1. Since the housing 64 is supported at its outer margin or periphery on the actuating member 60, it will be appreciated that the cam and slot interengaging means intermediate the respective gripping jaws and the actuating member 60 may be so constructed as to enable the jaws to be brought to inner limit positions very close to the supporting shaft 12.

From the foregoing it will be appreciated that the chuck 10 without the internal gripping jaws or elements 52, 54, 56 and 58 has utility and may be employed to advantage in environments where it is not essential to provide for inner axial penetration and gripping of the roll of material adjacent its core. It is to be further appreciated, however, that the mounting and function of the inner gripping assembly, which will now be described, is compatible with the chuck construction heretofore described and also finds useful application. Specifically, a group of four radially extending slots or guideways confine the inner gripping or clamping jaw for radial movement relative to the chuck. The mounting of and construction of each of the inner gripping or chuck jaws 52, 54, 56, and 58 is identical and accordingly it will suffice to describe only the gripping jaw 52 in detail. The gripping jaw 52 is seen to include an elongated body 52a which extends radially of the chuck and is slidably confined for movement in a guideway 94. The body 52a carries at its inner end an integral projecting wedge-shaped roll-penetrating element or finger 52b. The roll-penetrating wedge or finger 52b extends through the aligned central openings of the actuating member 60 and of the face plate 66 such that it may be brought into penetrating engagement endwise or longitudinally of the roll of material R. The projecting wedge-shaped roll-penetrating element or finger 52b will penetrate between the plies of the roll R at a location contiguous to the core C, the location of penetration being determined by the initial position of the gripping or clamping jaw 52 when the roll R is brought against the face plate 66. The giudeways or slots (e.g. slot 94 for jaw 52) for the respective inner gripping jaws are aligned with the guideways or slots (e.g. slot 76 for jaw 42) for the outer gripping jaws.

Journaled on the chuck body 20 intermediate the driving pulleys 36 and the housing 64, is a cylindrical actuating member 96 having one end thereof seated on a bearing hub 36a which is integral with the driving pulley 36 and projects from the inner face thereof. The actuating member 96 is formed at its other end with an integral spiral or worm gear 98. The rear side of each of the inner gripping or clamping jaws 52, 54, 56, 58 is formed with respective worm gear segments (e.g. the segment 100 of the clamping or gripping jaw 52) which intermeshed with the spiral worm gear 98. In response to axial turning of the cylindrical actuating member 96 in one direction, the inner gripping or clamping jaws 52, 54, 56, 58 move inwardly in unison; and in response to axial turning of the actuating member 96 in the opposite direction, the clamping jaws will move outwardly relative to each other. Accordingly, after axial penetration of the end face of the roll R by the inner gripping pins, the actuating member 96 may be grasped and spun by the operator to urge the respective inner gripping jaws toward each other for gripping engagement with the inner portion of the roll of material R and its core C.

Cooperating with the respective wedge-shaped roll-penetrating elements or fingers (e.g. the finger 52b of the clamping jaw 52) is a clamping sleeve 102 which is of an internal diameter to be snugly received on the stepped-down end section 12a of the supporting shaft 12 and is of an external diameter to form a substantial continuation of the main body of the supporting shaft 12. The clamping sleeve 102 terminates in about the same vertical plane as the end of the projecting roll-penetrating elements or fingers and can be slipped into the core C when the roll of material R is brought into abutment with the facing plate 66 of the chuck 10. The clamping sleeve 102 has at its rearward end an integral flange 104 which is secured by any appropriate means to the chuck body 18 internally of the cylindrical body section 20. The clamping sleeve 102 is appropriately cut away radially thereof, such as indicated at 106, to allow for the unobstructed movement of the gripping jaws 52, 54, 56 and 58 radially inwardly and outwardly, with the clamping sleeve 102 being substantially coextensive in length with the respective roll-penetrating elements or clamping fingers.

It will be appreciated that the description of operations as previously set forth may now be supplemented. With a chuck including the internal gripping jaws 52, 54, 56 and 58, the operator, after engaging the respective outer gripping jaws 42, 44, 46 and 48 as described, grasps the turnable actuating member 96 and spins the same in the direction appropriate to bring the inner clamping fingers towards each other, with the sleeve 102 providing a reaction force against which the core C and contiguous plies of material may be clamped. Accordingly, by the simple steps of first turning the housing 64 relative to the actuating member 60, and then turning the actuating member 96 relative to the chuck body 18, it is possible to engage in sequence the four outer clamping or gripping jaws and the four inner clamping or gripping jaws.

Although the invention herein has been illustrated with a chuck including four jaws in each clamping set, it will be appreciated that other jaw arrangements are equally within the contemplation of the present invention. In some instances three jaws at a circumferential spacing of 120° may suffice to obtain the requisite chucking force. Numerous other variations and changes will occur to those skilled in the art, and in some instances some features of the invention will be used without a corresponding use of other features of the invention. Accordingly, it is appropriate that the claims be construed in a manner consistent with the spirit and scope of the invention herein.

What is claimed is:

1. A chuck for turning a roll of material which is adapted to be supported on a shaft comprising an annular actuating member journaled for rotation on said shaft, a face plate adapted to abut an end face of said roll, said face plate being formed with a group of radially extending slots, a gripping jaw slidably mounted in each of said slots and movable inwardly and outwardly of said face plate, a back plate, means contiguous to the outer peripheries of said face and back plates for securing said plates together, said plates cooperating to form an annular seat therebetween, said actuating member disposed within said annular seat for turning movement relative to said plates, said plates being supported by said actuating member, releasable securing means between said plates and said actuating member to releasably prevent movement therebetween, and interengaging means between said actuating member and said gripping jaws for coupling said gripping jaws to said actuating member, turning movement of said actuating member relative to said plates being effective to simultaneously move said gripping jaws inwardly and outwardly into and out of engagement with said roll.

2. A chuck for turning a roll of material which is adapted to be supported on a stationary shaft comprising an annular actuating member journaled for rotation on said shaft, a face plate adapted to abut an end face of said roll, said face plate being formed with a group of radially extending slots each having a T-shaped cross section, a gripping jaw slidably mounted in each of said slots and movable inwardly and outwardly of said face plate, a back plate, means contiguous to the outer peripheries of said face and back plates for securing said plates together, said plates cooperating to form an annular seat therebetween, said actuating member disposed within said annular seat for turning movement relative to said plates, said plates being supported by said actuating member, releasable securing means between said plates and said actuating member to releasably prevent movement therebetween, and interengaging means between said actuating member and said gripping jaws for coupling said gripping jaws to said actuating member, turning movement of said actuating member relative to said plates being effective to simultaneously move said gripping jaws inwardly and outwardly into and out of engagement with said roll.

3. A chuck for turning a roll of material which is adapted to be supported on a stationary shaft comprising an annular actuating member journaled for rotation on said shaft, a face plate adapted to abut an end face of said roll, said face plate being formed with a group of radially extending slots, a gripping jaw slidably mounted in each of said slots and movable inwardly and outwardly of said face plate, a back plate, means contiguous to the outer peripheries of said face and back plates for securing said plates together, said plates cooperating to form an annular seat therebetween, said actuating member disposed within said annular seat for turning movement relative to said plates, said plates being supported by said actuating member, releasable securing means between said plates and said actuating member to releasably prevent movement therebetween, and interengaging cam and follower means between said actuating member and said gripping jaws for coupling said gripping jaws to said actuating member, turning movement of said actuating member relative to said plates being effective to simultaneously move said gripping jaws inwardly and outwardly into and out of engagement with said roll.

4. A chuck according to claim 3 wherein said interengaging cam and follower means includes a follower pin operatively connected to each gripping jaw and each engaged in a camming slot formed in said actuating member.

5. A chuck for turning a roll of material which is adapted to be supported on a stationary shaft comprising an annular actuating member journaled for rotation on said shaft, a face plate adapted to abut an end face of said roll and formed with a group of radially extending slots, a gripping jaw slidably mounted in each of said slots and movable radially inwardly and outwardly of said face plate, means contiguous to the outer periphery of said face plate and cooperating therewith to form an annular seat, said actuating member disposed within said annular seat for turning movement relative to said face plate, said face plate being supported by said actuating member, and interengaging means between said actuating member and said gripping jaws for coupling said gripping jaws to said actuating member, turning movement of said actuating member relative to said face plate being effective to simultaneously move said gripping jaws inwardly and outwardly into and out of engagement with said roll.

6. A chuck for turning a roll of material which is adapted to be supported on a stationary shaft comprising a chuck body adapted to be journaled on said shaft, a housing rotatable relative to said chuck body and including an annular face plate adapted to abut an end face of said roll and formed with a group of radially extending slots, a gripping jaw slidably mounted in each of said slots and movable radially inwardly and outwardly of said face plate into and out of engagement with the outer periphery of said roll, means contiguous to the outer periphery of said face plate and cooperating therewith to form an annular seat behind said face plate, an annular actuating member secured to said chuck body and disposed within said annular seat such that said face plate is supported by said actuating member for turning movement relative to said actuating member, interengaging means between said actuating member and said gripping jaws for coupling said gripping jaws to said actuating member, turning movement of said actuating member relative to said face plate being effective to simultaneously move said gripping jaws inwardly and outwardly into and out of engagement with said roll, said chuck body being formed with a further group of radially extending slots behind said seat, a further gripping jaw slidably mounted in each of said further slots and movable radially inwardly and outwardly of said face plate, said further gripping jaws each including a roll-penetrating element extending axially through said actuating member and face plate and adapted to axially penetrate said end face of said roll, a further actuating member journaled on said chuck body for turning movement relative thereto, and interengaging means between said further actuating member and said further gripping jaws for coupling said further gripping jaws to said further actuating member.

7. A chuck for turning a roll of material which is adapted to be supported on a stationary shaft comprising a chuck body adapted to be journaled on said shaft, a chuck housing rotatable relative to said chuck body including an annular face plate adapted to abut an end face of said roll and formed with a group of radially extending slots, a gripping jaw slidably mounted in each of said slots and movable radially inwardly and outwardly of said face plate into and out of engagement with the outer periphery of said roll, means contiguous to the outer periphery of said face plate and cooperating therewith to form an annular seat behind said face plate, an annular actuating member secured to said chuck body and disposed within said annular seat such that said face plate is supported by said actuating member for turning movement relative to said actuating member; interengaging means between said actuating member and said gripping jaws for coupling said gripping jaws to said actuating member, turning movement of said actuating member relative to said face plate being effective to simultaneously move said gripping jaws inwardly and outwardly into and out of engagement with said roll, said chuck body being formed with a further group of radially extending slots behind said seat, and a further gripping jaw slidably mounted in each of said further slots and movable radially inwardly and outwardly of said face plate, said further gripping jaws each including a roll-penetrating element extending axially through said actuating member and face plate and adapted to axially penetrate said end face of said roll.

8. In combination, a shaft adapted to receive a roll of material and a chuck for rotating said roll of material comprising a chuck body, bearing means operatively connected to said chuck body for journaling said chuck body on said shaft for rotation relative thereto, an annular actuating member turnable relative to said shaft and operatively connected to said chuck body, an annular face plate confronting said actuating member and adapted to contact an end face of said roll of material, means on said face plate engaging at least the outer periphery of said actuating member for mounting said face on said actuating member for support of said face plate and for turning movement relative to said actuating member, a group of gripping jaws, means mounting each of said gripping jaws on said face plate for movement radially inwardly and outwardly thereof, and means coupling each of said gripping jaws to said actuating member for radial movement in response to relative turning movement between said actuating member and said face plate.

9. In combination, a shaft adapted to receive a roll of material and a chuck for rotating said roll of material comprising a chuck body, bearing means operatively connected to said chuck body for journaling said chuck body on said shaft for rotation relative thereto, drive means operatively connected to said chuck body for rotating said chuck body on said shaft, an annular actuating member turnable relative to said shaft and operatively connected to said chuck body, an annular face plate confronting said actuating member and adapted to contact an end face of said roll of material, means on said face plate engaging at least the outer periphery of said actuating member for mounting said face plate on said actuating member for support of said face plate and for turning movement relative to said actuating member, a group of gripping jaws, means mounting each of said gripping jaws on said face plate for movement radially inwardly and outwardly thereof, and means coupling each of said gripping jaws to said actuating member for radial movement in response to relative turning movement between said actuating member and said face plate.

10. In combination, a shaft adapted to receive a roll of material and a chuck for rotating said roll of material comprising a chuck body, bearing means operatively connected to said chuck body for journaling said chuck body on said shaft for rotation relative thereto, an annular actuating member turnable relative to said shaft and operatively connected to said chuck body, a housing including an annular face plate confronting said actuating member and adapted to contact an end face of said roll of material, means on said face plate engaging at least the outer periphery of said actuating member for mounting said face plate on said actuating member for support of said face plate and for turning movement relative to said actuating member, a group of gripping jaws, means mounting each of said gripping jaws on said face plate for movement radially inwardly and outwardly thereof, and means coupling each of said gripping jaws to said actuating member for radial movement in response to relative turning movement between said actuating member and said face plate, releasable securing means between said actuating member and said face plate to releasably prevent movement therebetween, said chuck body being formed with a further group of radially extending slots behind said actuating member, a further gripping jaw slidably mounted in each of said further slots and movable radially inwardly and outwardly of said face plate, said further gripping jaws each including a roll-penetrating element extending axially through said actuating member and face plate and adapted to axially penetrate said end face of said roll, a further actuating member journaled on said chuck body for turning movement relative thereto, and interengaging means between said further actuating member and said further gripping jaws for coupling said further gripping jaws to said further actuating member.

11. A chuck for turning a roll of material on a stationary shaft comprising a chuck body journaled for rotation on said shaft, an actuating member rigidly secured to said body for rotation therewith about said shaft, a face plate adapted to abut the ends of said roll of material, means on said face plate engaging said actuating member for support of said face plate and effective to permit rotational movement therebetween, releasable securement means between said face plate and said actuating member to releasably arrest said rotational movement, said face plate formed with a group of radially extending slots therein, a gripping jaw slidably mounted in each of said slots and movable radially inwardly and outwardly of said face plate, interengaging means between said actuating member and said jaws for coupling said jaws to said actuating member, rotational movement of said face plate with respect to said actuating member being effective to simultaneously move said gripping jaws radially inwardly and outwardly into and out of contact with said roll of material.

12. A chuck for turning a roll of material on a stationary shaft comprising a chuck body journaled for rotation on said shaft, an actuating member rigidly secured to said body for rotation therewith about said shaft, a face plate adapted to abut the ends of said roll of material, means on said face plate engaging said actuating member for support of said face plate and effective to permit rotational movement therebetween, releasable securement means between said face plate and said actuating member to releasably arrest said rotational movement, said face plate formed with a group of radially extending slots therein each having a T-shaped cross section, a gripping jaw having a radially inwardly oriented roll-penetrating pin slidably mounted in each of said slots and movable radially inwardly and outwardly of said face plate, interengaging cam and follower means between said actuating member and said jaws comprising pins connected to said jaws and extending through said face plate and spiral grooves in said actuating member into which said pins extend for coupling said jaws to said actuating member, rotational movement of said face plate with respect to said actuating member being effective to simultaneously move said gripping jaws radially inwardly and outwardly into and out of contact with said roll of material.

References Cited in the file of this patent
UNITED STATES PATENTS

| | | |
|---|---|---|
| 1,263,894 | Hottinger | Apr. 23, 1918 |
| 2,703,242 | Sloan et al. | Mar. 1, 1955 |
| 2,780,470 | Ridout | Feb. 5, 1957 |